(12) United States Patent
Alavandi et al.

(10) Patent No.: US 9,376,143 B2
(45) Date of Patent: Jun. 28, 2016

(54) DEFLECTOR WITH FRAME RAIL FOLLOWER AND GUIDE ON DEFLECTOR END

(71) Applicant: FORD GLOBAL TECHNOLOGIES, LLC, Dearborn, MI (US)

(72) Inventors: Bhimaraddi Venkaraddi Alavandi, Canton, MI (US); Jeffrey Lawrence Laya, Northville, MI (US); Matt Alan Niesluchowski, Clarkston, MI (US); Jeffrey Dan Rupp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/085,884

(22) Filed: Nov. 21, 2013

(65) Prior Publication Data

US 2015/0137556 A1    May 21, 2015

(51) Int. Cl.
| | |
|---|---|
| *B62D 25/08* | (2006.01) |
| *B60R 19/26* | (2006.01) |
| *B60R 19/38* | (2006.01) |
| *B60R 19/16* | (2006.01) |
| *B62D 7/22* | (2006.01) |

(52) U.S. Cl.
CPC ............. *B62D 25/082* (2013.01); *B60R 19/16* (2013.01); *B60R 19/26* (2013.01); *B60R 19/38* (2013.01); *B62D 25/08* (2013.01); *B62D 7/22* (2013.01)

(58) Field of Classification Search
CPC ........ B62D 7/22; B62D 25/082; B62D 25/08; B60R 19/26; B60R 19/38; B60R 19/16

USPC ................. 296/187.1, 180.1, 187.04, 187.09; 280/784; 293/25, 26, 38, 39, 40, 142, 293/143, 144, 145

See application file for complete search history.

(56) References Cited

U.S. PATENT DOCUMENTS

| | | | | |
|---|---|---|---|---|
| 4,929,008 | A * | 5/1990 | Esfandiary | B60R 19/20 188/376 |
| 7,775,582 | B2 * | 8/2010 | Browne et al. | 296/180.1 |
| 7,819,218 | B2 | 10/2010 | Eichberger et al. | |
| 7,926,847 | B2 | 4/2011 | Auer et al. | |
| 8,414,041 | B2 | 4/2013 | Paare et al. | |
| 8,480,130 | B2 * | 7/2013 | Dandekar et al. | 280/784 |
| 2010/0140965 | A1 * | 6/2010 | Schoenberger et al. | 293/118 |

FOREIGN PATENT DOCUMENTS

JP      2004306871 A      4/2004

* cited by examiner

*Primary Examiner* — Joseph D Pape
*Assistant Examiner* — Dana Ivey
(74) *Attorney, Agent, or Firm* — Jason C. Rogers; Brooks Kushman P.C.

(57) ABSTRACT

A deflector assembly for a vehicle having a bumper and a frame rail that are connected by a crush-can. The deflector assembly absorbs impact forces in a small overlap rigid barrier test by directing the impact from the barrier in a lateral direction toward the frame rail. A guide and follower, such as a wheel-shaped roller, a ball-shaped roller, a sliding shoe, or a fastener is received in a guide member that defines a guide surface extending longitudinally to guide a back end of the deflector assembly in a full frontal impact in a longitudinal direction.

15 Claims, 4 Drawing Sheets

US 9,376,143 B2

DEFLECTOR WITH FRAME RAIL FOLLOWER AND GUIDE ON DEFLECTOR END

TECHNICAL FIELD

This disclosure relates to deflectors for vehicle front end impact absorption as tested in a small overlap rigid barrier test without interfering with full frontal impact tests.

BACKGROUND

Land vehicles are tested for crashworthiness by a variety of tests including frontal impacts, side impacts, rear impacts, roll-over and other tests. Full frontal impact tests were previously developed that specified that a vehicle impacts a barrier between the frame rails that extend longitudinally relative to the vehicle. In a full frontal impact test, the frame rails provided the primary support for the vehicle body.

A test promulgated by the Insurance Institute for Highway Safety (IIHS) simulates small overlap frontal crashes against a rigid barrier. In the proposed test, the vehicle impacts a rigid barrier having a six inch pole-like radius on one corner with a 25% overlap at 40 MPH. The impact is outboard of the frame rails and the frame rails do not provide as much resistance to intrusion into the passenger compartment as in the case of impacts between the frame rails. The extent of any intrusions into the passenger compartment are measured at the lower hinge pillar, rocker panel, footrest, left toe pan, brake pedal, parking brake pedal, steering column, upper hinge pillar, upper dash, and left instrument panel.

Deflectors that are attached to the outer end of a vehicle bumper have been tested and have reduced intrusions into the passenger compartment. Additional reduction of intrusions in the small overlap rigid barrier (SORB) test results are desired that further reduce intrusions and are simple and cost effective.

One problem with adding deflectors to a vehicle is that the deflectors may interfere with the performance of impact absorption systems such as crush-cans that are used to minimize the effects of a full-frontal impact. In the case of impacts in between the frame rails, crush-cans and/or frame rails are designed to deform in an accordion fashion to maximize impact energy absorption. Deflectors addressing small overlap impacts can disturb the accordion deformation of crush-can/frame rail. Modifications of vehicle design to address small over-lap impacts should be designed to minimize any effect on other impact modes.

This disclosure is directed to solving the above problems and other problems as summarized below.

SUMMARY

According to one aspect of this disclosure, a deflector assembly is provided for a vehicle having a bumper and a frame rail. The deflector assembly comprises a deflector beam extending outboard from the bumper to an outer end and returning to a back end proximate the frame rail. A guide is attached to the back end of the deflector. A follower is attached to the frame rail and is received by the guide.

According to another aspect of this disclosure, a front-end assembly is disclosed for a vehicle that includes a frame rail and a bumper disposed in front of the frame rail. A deflector assembly is disclosed that includes a deflector rail that extends in an outboard direction from the bumper to an outer end and that returns to a back end proximate the frame rail. A guide is attached to the back end of the deflector. A follower is attached to the frame rail and is received by the guide.

According to another aspect of this disclosure an impact absorbing apparatus is provided for a front-end of a vehicle having a bumper and a frame rail. The impact absorbing assembly comprises a deflector attached to the bumper that includes a deflector rail extending outboard from the bumper to an outer end and returning to a back end proximate the frame rail with a guide being attached to the back end. A follower is attached to the frame rail that is received by the guide. A longitudinally directed force of an impact with an object that is longitudinally aligned with the deflector is absorbed by the deflector rail. This longitudinally directed force bends the deflector rail about the vertical axis hence exerts lateral load on the frame rail through the back end of the deflector. This lateral load results in minimum sliding of the back end of the deflector, but aids in impact energy absorption by the frame rail. The lateral load on the frame rail aids in deflecting or pivoting the vehicle away from the impacting object. This lateral load applied to the frame rail substantially enhances the participation of the frame rail in mitigating the severity of the impact. The guide on the back end is not forced to move relative to the follower causing the frame rail to bend and pivot the vehicle about a vertical axis. The force of the impact with the impact absorbing apparatus moves the vehicle behind the follower laterally away from the object.

According to other aspects of the embodiments summarized above, the follower may be wheel-shaped, ball-shaped, a sliding shoe, or a fastener or pin. The guide may define a channel or slot extending in the fore-and-aft direction. The guide may include an upper arm disposed above the follower and a lower arm disposed below the follower. In addition, the guide may include an outer wall on an outboard side of the follower and an inner wall on an inboard side of the follower. The inner wall may define a slot and the follower may be attached to the frame rail by an elongated element that extends through the slot to the frame rail.

The bumper may be held in a spaced relationship relative to the frame rail by a crush-can and the deflector assembly may be attached to the bumper forward of the crush-can. The follower may be attached to the frame rail at a location rearward of the crush-can. The guide moves relative to the follower in a full frontal impact and is configured to disengage the follower if the back end of the deflector is moved rearward of the follower in the impact.

The bumper may be held in a spaced relationship relative to the frame rail by a crush-can with the deflector assembly being attached to the bumper forward of the crush-can. The follower is attached to the frame rail at a location rearward of the crush-can. The guide may move relative to the follower in an impact and is configured to disengage the roller if the back end of the deflector is moved rearward of the roller in the full frontal impact.

The above aspects of this disclosure and other aspects are described below in greater detail with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
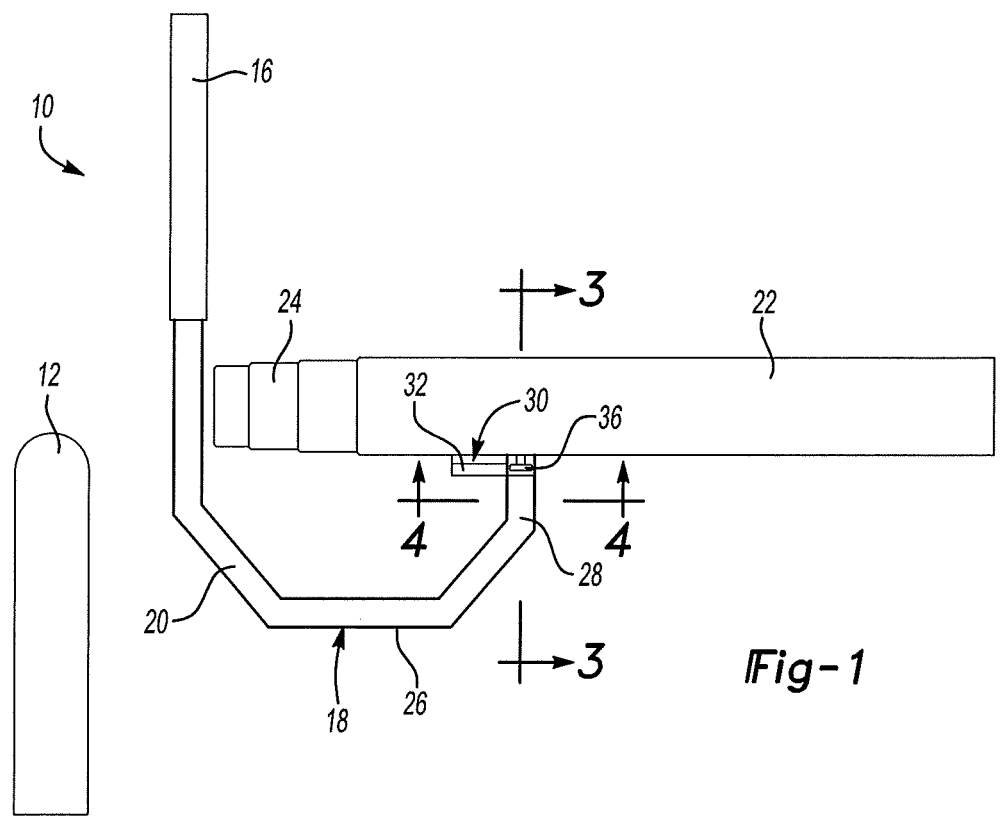
FIG. 1 is a diagrammatic top plan view of a part of a front end of a vehicle having a frame rail and a front bumper that is equipped with a deflector assembly made according to one example of this disclosure in an as-assembled condition.
Figure 2:
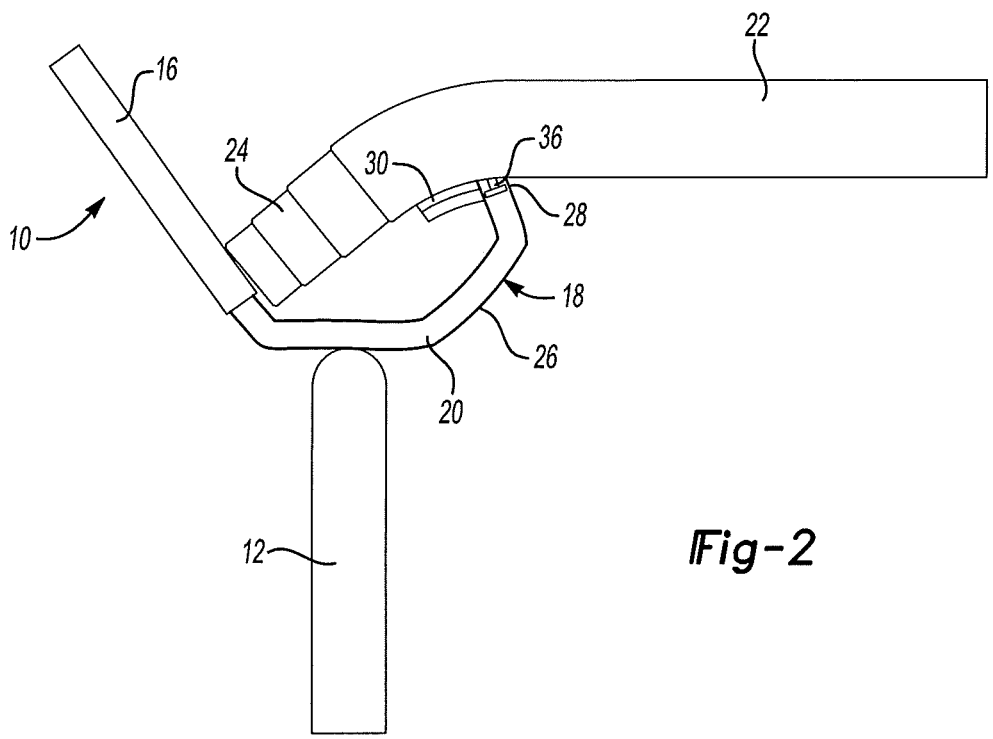
FIG. 2 is a diagrammatic top plan view of a part of a front end of a vehicle having a frame rail and a front bumper that is equipped with a deflector assembly as illustrated in FIG. 1 in a post-impact condition.
Figure 3:
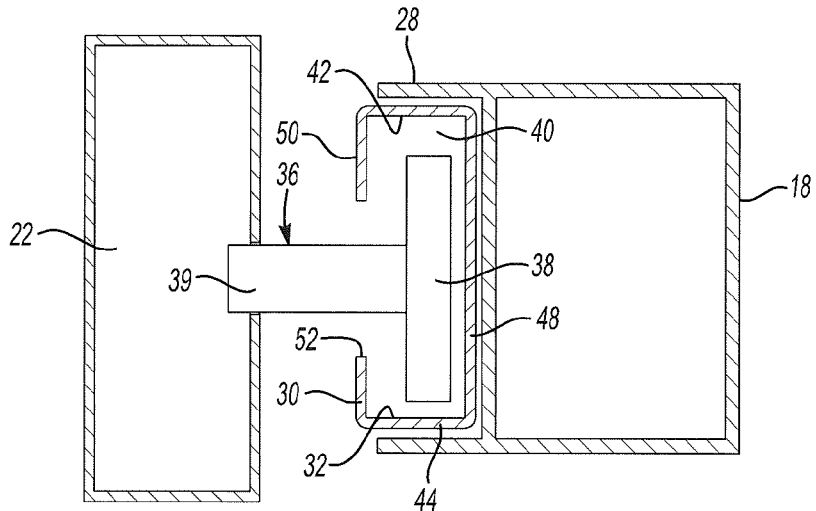
FIG. 3 is a cross-sectional view taken along the line 3-3 in FIG. 1.

Referring to FIGS. 1 through 3, a front end 10 of a vehicle is illustrated with a small overlap rigid barrier (SORB) 12 prior to a test impact. The front end 10 of the vehicle includes a bumper 16 and a deflector assembly 18. The deflector assembly 18 includes a hook-shaped deflector 20 that extends from the bumper 16 to a frame rail 22. A crush-can 24 is shown assembled between the bumper 16 and the frame rail 22.

The deflector assembly 18 includes an outer end 26 that extends longitudinally back to a back end 28 of the hook-shaped deflector 20. A guide member 30 is attached to the back end 28 of the deflector 20. A guide surface 32 is provided on the guide member 30. A follower 36 is attached to the frame rail 22. The guide member 30 receives the follower 36.

Referring specifically to FIG. 3, the follower 36 is a wheel-shaped roller 38. The roller 38 may be mounted with an elongate member 39 to the frame rail 22 to rotate or, alternatively, the roller 38 may be mounted to be non-rotatable. The guide member 30 defines a channel 40 that receives the roller 38. The guide 30 includes an upper arm 42 and a lower arm 44. The upper arm 42 and the lower arm 44 extend between an outer wall 48 of the guide member 30 to an inner wall 50 of the guide member 30. The inner wall 50 defines a slot 52. The follower 36, in this case the wheel-shaped roller 38, is received in the slot 52.

Figure 4A:
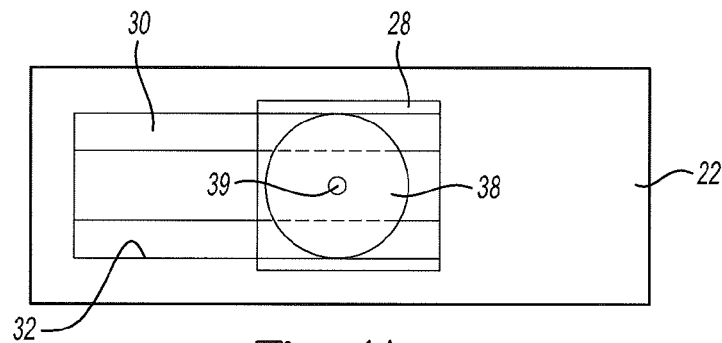
FIG. 4A is a diagrammatic side elevation view taken from the perspective of line 4-4 in FIG. 1 showing the back end of the deflector in the as-assembled position with a wheel-shaped follower disposed in the guide.
Figure 4B:
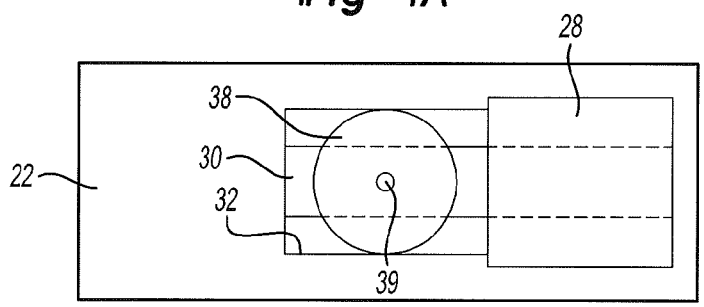
FIG. 4B is similar to FIG. 4A showing the end of the deflector including the guide shifted rearward relative to the wheel-shaped follower during a full frontal impact.
Figure 4C:
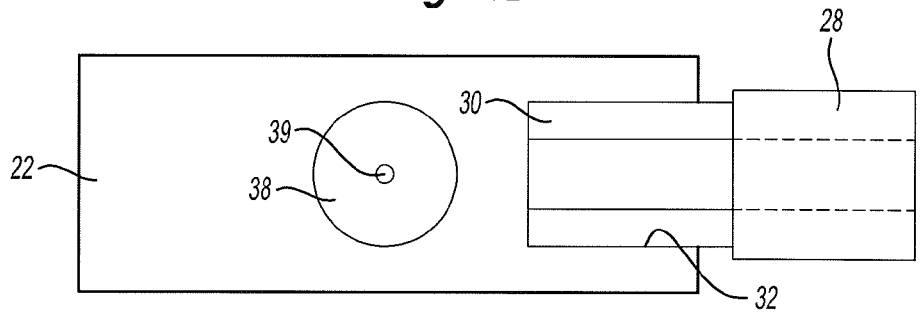
FIG. 4C is similar to FIG. 4A showing the end of the deflector including the guide shifted rearward to a point after the guide releases the wheel-shaped follower in a late stage of a full frontal impact.

Referring to FIGS. 4A-4C, the back end 28 of the deflector 20 (shown in FIG. 1) is shown with the guide member 30 that includes the guide surface 32. The wheel-shaped roller 38 is shown attached to the frame rail 22 by the elongate member 39. In FIG. 4A, the roller 38 is received in the guide 30 that is attached to the back end 28. The roller 38 in FIG. 4A is in the "as-assembled" position.

Referring to FIG. 4B, the roller is shown disposed in the guide 30, but is shifted as a result of the back end 28 being driven rearward in a full frontal impact test. The roller 38 may roll along the guide surface 32 and may hold the back end 28 in alignment with the frame rail 22.

Referring to FIG. 4C, the back end 28 is shown to be driven further rearward until the guide member 30 becomes separated from the roller 38.

Referring back to FIG. 1, the front end 10 is shown as-assembled and prior to an impact with the rigid barrier 12. The roller 38 in the guide 30 is provided to avoid interference by the deflector assembly 18 with the performance of the crush-cans 20 in a full frontal impact. In a full frontal impact, the bumper 16 is driven into the crush-cans 24 to collapse the crush-cans 24 towards the frame rail 22. The deflector assembly 18 moves with the bumper 16 in a rearward direction. The guide 30 that is secured to the back end 28 of the deflector 20 and rolls or slides on the roller 38. The roller 38 follows the guide surface 32 within channel 40 to guide the movement of the back end 28 of the deflector 20 in a longitudinal direction and in alignment with the frame rail 22. The guide member 30 and roller 38 function to minimize any interference with energy absorption by the crush-can 24.

Referring to FIG. 2, the front end 10 is shown after impacting the rigid barrier 12. The deflector assembly 18 is longitudinally aligned with the rigid barrier 12 prior to the SORB impact. The SORB impact of the deflector assembly 18 with the rigid barrier causes the vehicle to pivot away from the barrier and limits intrusions into the passenger compartment. The deflector assembly 18 in a small overlap rigid barrier test is driven into the frame rail 22. The impact load applied by the rigid barrier 12 is directed into the frame rail 22. The guide member 30 remains in engagement with the roller 38 due to the deformation or bending of the frame rail 22 caused by the load applied by the back end 28 of the deflector 20 against the frame rail 22. The deflector 20 undergoes deformation as a result of the impact.

Figure 5:
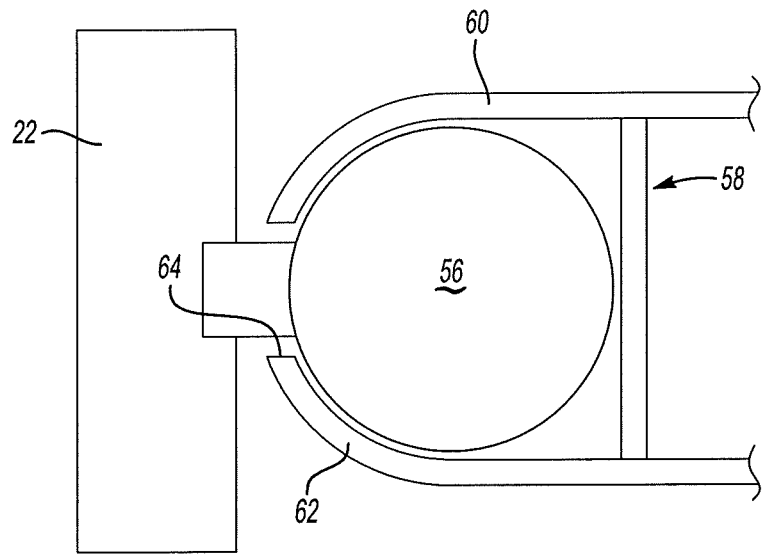
FIG. 5 is a diagrammatic front elevation view of an alternative embodiment of the follower showing a ball-shaped roller that may be substituted for the wheel in FIGS. 3 and 4A-4C.

Referring to FIG. 5, an alternative embodiment is shown that includes a ball-shaped member 56 instead of the wheel-shaped roller 38 shown and described with reference to FIGS. 1-4. The ball-shaped member 56 is received by the back end 58 of the hook-shaped deflector 20 shown in FIGS. 1-4. A curved upper arm 60 and a curved lower arm 62 define a slot 64. The upper arm 60 and lower arm 62 extend in a forward direction relative to the back end 58 and function to guide the back end 28 of the deflector 20 in a manner similar to guide member 30 (shown in FIGS. 1-4). The slot 64 extends in a longitudinal direction from the back end 58 between the upper arm 60 and the lower arm 62.

Figure 6A:
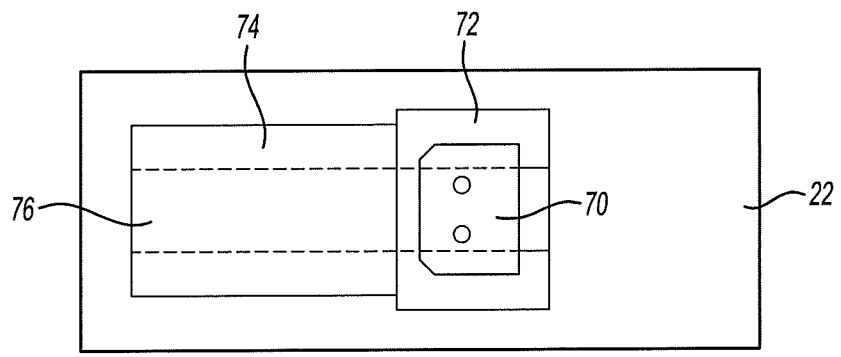
FIG. 6A is a 4A is a diagrammatic side elevation view taken from the perspective of FIG. 4A showing the back end of the deflector in the as-assembled position with a sliding shoe follower disposed in the guide.
Figure 6B:
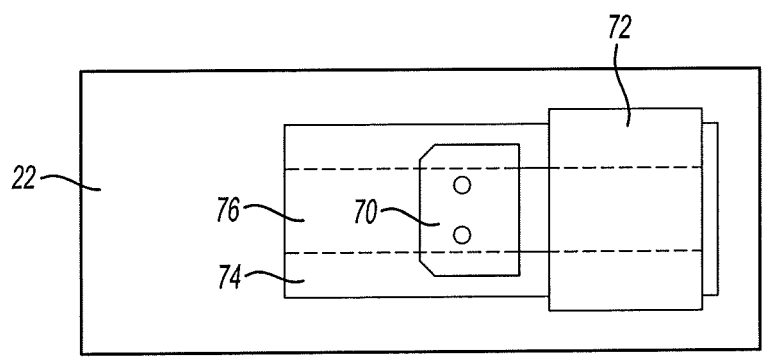
FIG. 6B is similar to FIG. 6A showing the end of the deflector including the guide shifted rearward relative to the sliding shoe follower during a full frontal impact.
Figure 6C:
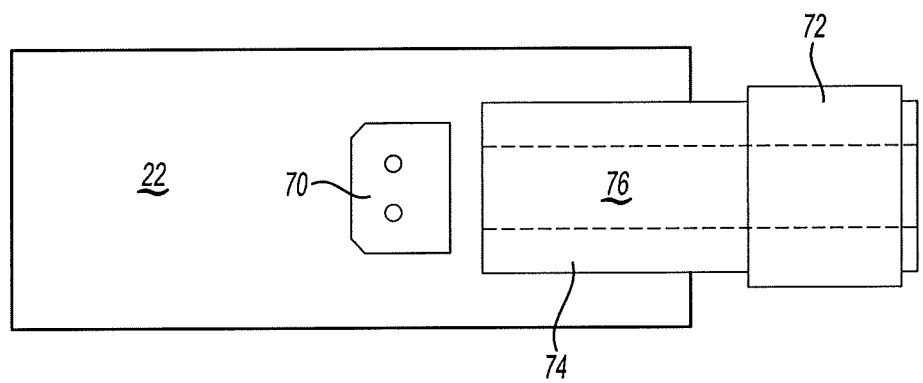
FIG. 6C is similar to FIG. 6A showing the end of the deflector including the guide shifted rearward to a point after the guide releases the sliding shoe follower in a late stage of a full frontal impact.

Referring to FIGS. 6A-6C, another alternative embodiment is illustrated that includes a sliding shoe 70. The sliding shoe 70 is secured to a back end 72 of the deflector 20 (shown in FIGS. 1-4). A guide 74 is attached to the back end 72 and defines a channel 76 that extends in a longitudinal direction from the back end 72 toward the front of the frame rail 22. As shown in FIG. 6A, the sliding shoe 70 is in the as-assembled position with the sliding shoe in alignment with the back end

72. The sliding shoe 70 is also disposed within the channel 76 defined by the guide 74. Referring to FIG. 6B, the sliding shoe 70 is shown shortly after a full frontal impact. The sliding shoe 70 is disposed in the guide 74 within the channel 76, but the back end 72 is shifted in a rearward direction. Referring to FIG. 6C, the back end 72 is shown shifted rearward with the sliding shoe 70 being separated from the guide 74. The channel 76 defined by the guide 74 has an open forward end that allows the guide 74 to be separated from the sliding shoe 70.

Figure 7:
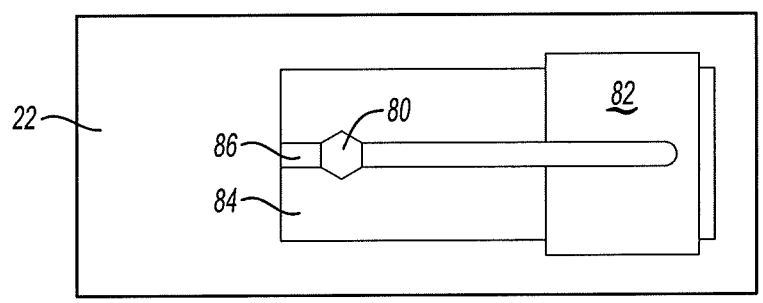
FIG. 7 is a diagrammatic side elevation view of an alternative embodiment of the follower similar to FIG. 6B showing the end of the deflector including a slotted guide shifted rearward relative to a fastener during a full frontal impact.

Referring to FIG. 7, another alternative embodiment is shown that includes a fastener 80, such as a bolt or pin, attached to the frame rail 22. The bolt 80 is shown in a view similar to FIGS. 4B and 6B at an early point in a full frontal impact. The fastener 80 in its as-assembled condition is received within the guide 84 in a slot defined by the bolt 80. The bolt 80 is aligned with the rearward 82 of the deflector 20 (shown in FIGS. 1-4) in the as-assembled position. In a full frontal impact, the slot 86 as defined by the guide 84 allows the back end 82 to move rearward while the fastener 80 guides the deflector in a longitudinal direction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A deflector assembly for a bumper and a frame rail comprising:
    a crush-can spacing a bumper from a frame rail;
    a deflector attached to the bumper forward of the crush-can to an outer end and returning to a back end proximate the frame rail;
    a guide member having a longitudinally extending guide surface attached to the back end, wherein the guide member defines a channel extending in a fore-and-aft direction, wherein the guide member includes an upper arm disposed above the follower and a lower arm disposed below the follower; and
    a follower attached to the frame rail at a location rearward of the crush-can and being received by the guide member, wherein the guide member includes an outer wall on an outboard side of the follower and an inner wall on an inboard side of the follower, wherein the inner wall defines a slot, and wherein the follower is attached to the frame rail by an elongated element that extends through the slot from the frame rail to the follower, wherein the guide member guides the back end in a full-frontal impact.

2. The assembly of claim 1 wherein the follower is a wheel that is attached to the frame rail to move relative to the guide surface in the full-frontal impact.

3. The assembly of claim 1 wherein the follower is a ball-shaped member that is attached to the frame rail to move relative to the guide surface in the full-frontal impact.

4. The assembly of claim 1 wherein the follower is a sliding shoe that is attached to the frame rail to move relative to the guide surface in the full-frontal impact.

5. The assembly of claim 1 wherein the follower is a fastener that is attached to the frame rail, wherein the guide surface defines a slot, and wherein the guide member moves relative to the fastener in the full-frontal impact.

6. A deflector assembly comprising:
    a crush-can spacing a bumper from a frame rail;
    a deflector attached to the bumper forward of the crush-can and extending rearwardly to a back end of the deflector disposed proximate the frame rail;
    a guide member attached to the back end; and
    a follower attached to the frame rail rearward of the crush-can and being received by the guide member that guides the back end in a full-frontal impact.

7. A deflector assembly comprising:
    a crush-can spacing a bumper from a frame rail;
    a deflector attached to the bumper forward of the crush-can and extending rearwardly to a back end of the deflector disposed proximate the frame rail;
    a guide member attached to the back end; and
    a follower attached to the frame rail rearward of the crush-can and being received by the guide member that guides the back end in a full-frontal impact, wherein the guide member moves relative to the follower in the full-frontal impact and disengages the follower when the back end of the deflector is moved rearward of the follower in the impact.

8. A front-end assembly for a vehicle comprising:
    a frame rail;
    a bumper disposed in front of the frame rail; and
    a deflector assembly including:
        a deflector rail extending outboard from the bumper to an outer end of the deflector rail and returning to a back end of the deflector rail proximate the frame rail, wherein the back end is laterally driven into the frame rail;
        a guide member defining a channel extending in the fore-and-aft direction attached to the back end, wherein the guide member includes an outer wall on an outboard side of the follower and an inner wall on an inboard side of the follower, the inner wall defining a slot; and
        a follower attached to the frame rail that is received by the guide member including an upper arm disposed above the follower and a lower arm disposed below the follower, wherein the follower is attached to the frame rail by an elongated element that extends through the slot from the frame rail to the guide member and wherein the follower guides movement of the guide member relative to the follower.

9. The assembly of claim 8 wherein the follower has a circular cross-section in a longitudinal plane.

10. A front-end assembly for a vehicle comprising:
    a frame rail;
    a bumper held by a crush-can in a spaced relationship relative to a front of the frame rail; and
    a deflector assembly including:
        a deflector rail attached to the bumper forward of the crush-can and extending outboard from the bumper to an outer end of the deflector rail and returning to a back end of the deflector rail proximate the frame rail, wherein the back end is laterally driven into the frame rail;
        a guide member attached to the back end; and
        a follower attached to the frame rail at a location rearward of the crush-can, wherein the follower is received by the guide member that guides movement of the guide member relative to the follower.

11. The assembly of claim 10 wherein the guide member moves relative to the follower in the full-frontal impact and disengages the follower if the back end of the deflector is moved rearward of the follower in the full-frontal impact.

12. An impact absorbing apparatus for a front-end of a vehicle having a bumper and a frame rail comprising:

a deflector assembly attached to the bumper including:
- a deflector rail extending outboard from the bumper to an outer end of the deflector rail and returning to a back end of the deflector rail proximate the frame rail;
- a guide member attached to the back end; and
- a follower affixed to the frame rail, wherein the follower is received by the guide member, wherein a full-frontal impact forces the guide member to move relative to the follower, and wherein an impact with an object that is longitudinally aligned with the deflector is absorbed by the deflector that is driven into the frame rail to bend the frame rail and pivot the vehicle about a vertical axis to move the vehicle behind the deflector laterally away from the object.

13. The impact absorbing apparatus of claim 12 wherein the guide member defines a channel extending in a fore-and-aft direction.

14. The impact absorbing apparatus of claim 12 wherein the bumper is held in a spaced relationship relative to the frame rail by a crush-can, wherein the deflector assembly is attached to the bumper forward of the crush-can and the follower is attached to the frame rail at a location rearward of the crush-can.

15. The impact absorbing apparatus of claim 12 wherein the guide member moves relative to the follower in the full-frontal impact and disengages the follower when the back end of the deflector is moved rearward of the follower in the full-frontal impact.

\* \* \* \* \*